United States Patent
Luo et al.

(10) Patent No.: US 10,341,914 B2
(45) Date of Patent: Jul. 2, 2019

(54) ANTENNA SELECTION IN LTE/LTE-A NETWORKS WITH UNLICENSED SPECTRUM

(71) Applicant: QUALCOMM Incorporated, San Diego, CA (US)

(72) Inventors: Tao Luo, San Diego, CA (US); Durga Prasad Malladi, San Diego, CA (US); Xiliang Luo, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 14/624,787

(22) Filed: Feb. 18, 2015

(65) Prior Publication Data
US 2015/0237548 A1    Aug. 20, 2015

Related U.S. Application Data

(60) Provisional application No. 61/941,173, filed on Feb. 18, 2014.

(51) Int. Cl.
| | |
|---|---|
| *H04L 5/00* | (2006.01) |
| *H04L 27/00* | (2006.01) |
| *H04W 36/06* | (2009.01) |

(52) U.S. Cl.
CPC ........... *H04W 36/06* (2013.01); *H04L 5/0076* (2013.01); *H04L 27/0006* (2013.01)

(58) Field of Classification Search
CPC .............................. H04W 36/06; H04L 5/0076
USPC ........................................................ 370/329
See application file for complete search history.

(56) References Cited

U.S. PATENT DOCUMENTS

| | | | |
|---|---|---|---|
| 8,155,096 B1 * | 4/2012 | Proctor, Jr. ........... | H04W 52/42 370/335 |
| 8,902,828 B2 | 12/2014 | Prakash et al. | |
| 2006/0160563 A1 | 7/2006 | Ku | |
| 2008/0238807 A1 * | 10/2008 | Ibrahim ................. | H01Q 21/29 343/876 |

(Continued)

FOREIGN PATENT DOCUMENTS

| | | |
|---|---|---|
| JP | 2010527195 A | 8/2010 |
| WO | WO-2011044038 A2 | 4/2011 |

OTHER PUBLICATIONS

Partial International Search Report—PCT/US2015/016341—ISA/EPO—dated Jun. 9, 2015.

(Continued)

*Primary Examiner* — Peter G Solinsky
(74) *Attorney, Agent, or Firm* — Qualcomm/Norton Rose Fulbright US LLP

(57) ABSTRACT

Antenna selection and reassignment in multiple radio access technology (RAT) communication systems with unlicensed spectrum is disclosed. Aspects include a user equipment (UE) monitoring for a channel reserving signal in each frame from multiple transmission sources. If no channel reserving signal is detected, then the UE reassigns one or more of the antennas previously assigned to the transmission sources with no activity detected. Additional aspects include base stations that determine a clear channel assessment (CCA) status for each of unlicensed carrier designated for transmission to a UE. The base station will transmit a receive antenna usage adjustment signal to the UE based on the determined CCA status.

29 Claims, 8 Drawing Sheets

(56) References Cited

U.S. PATENT DOCUMENTS

| | | | |
|---|---|---|---|
| 2014/0038625 A1 | 2/2014 | Palanivelu et al. | |
| 2014/0254502 A1* | 9/2014 | Cai .................. | H04W 48/20 |
| | | | 370/329 |
| 2014/0349584 A1* | 11/2014 | Clevorn ............ | H04B 7/0689 |
| | | | 455/67.13 |
| 2015/0043384 A1* | 2/2015 | Hui .................. | H04L 41/12 |
| | | | 370/255 |
| 2015/0282077 A1* | 10/2015 | Yavuz ............... | H04W 52/0212 |
| | | | 455/452.1 |
| 2016/0050684 A1* | 2/2016 | Ni .................... | H04W 28/16 |
| | | | 370/329 |
| 2016/0095002 A1* | 3/2016 | Zhan ................ | H04B 7/15557 |
| | | | 370/294 |

OTHER PUBLICATIONS

International Search Report and Written Opinion—PCT/US2015/016341—ISA/EPO—dated Aug. 31, 2015.

* cited by examiner

ANTENNA SELECTION IN LTE/LTE-A NETWORKS WITH UNLICENSED SPECTRUM

CROSS-REFERENCE TO RELATED APPLICATIONS

This application claims the benefit of U.S. Provisional Patent Application No. 61/941,173, entitled, "ANTENNA SELECTION IN LTE/LTE-A NETWORKS WITH UNLICENSED SPECTRUM", filed on Feb. 18, 2014, which is expressly incorporated by reference herein in its entirety.

BACKGROUND

Field

Aspects of the present disclosure relate generally to wireless communication systems, and more particularly, to antenna selection in long term evolution (LTE) and LTE-Advanced (LTE-A) networks with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes monitoring for a channel reserving signal from a plurality of transmission sources in communication with a UE, and reassigning one or more receive antennas assigned to one or more transmission sources of the plurality of transmission sources in response to detecting no channel reserving signal from the one or more transmission sources.

In an additional aspect of the disclosure, a method of wireless communication includes determining a clear channel assessment (CCA) status for each of a plurality of unlicensed carriers designated for transmission by the base station to a UE, and transmitting to the UE a receive antenna usage adjustment signal based on the determined CCA status.

In an additional aspect of the disclosure, an apparatus configured for wireless communication includes means for monitoring for a channel reserving signal from a plurality of transmission sources in communication with a UE, and means for reassigning one or more receive antennas assigned to one or more transmission sources of the plurality of transmission sources in response to detecting no channel reserving signal from the one or more transmission sources.

In an additional aspect of the disclosure, an apparatus configured for wireless communication includes means for determining a clear channel assessment (CCA) status for each of a plurality of unlicensed carriers designated for transmission by a base station to a UE, and means for transmitting to the UE a receive antenna usage adjustment signal based on the determined CCA status.

In an additional aspect of the disclosure, a computer-readable medium having program code recorded thereon. This program code includes code to monitor for a channel reserving signal from a plurality of transmission sources in communication with a UE, and code to reassign one or more receive antennas assigned to one or more transmission sources of the plurality of transmission sources in response to detecting no channel reserving signal from the one or more transmission sources.

In an additional aspect of the disclosure, a computer-readable medium having program code recorded thereon. This program code includes code to determine a clear channel assessment (CCA) status for each of a plurality of unlicensed carriers designated for transmission by the base station to a UE, and code to transmit to the UE a receive antenna usage adjustment signal based on the determined CCA status.

In an additional aspect of the disclosure, an apparatus includes at least one processor and a memory coupled to the processor. The processor is configured to monitor for a channel reserving signal from a plurality of transmission sources in communication with a UE, and to reassign one or more receive antennas assigned to one or more transmission sources of the plurality of transmission sources in response to detecting no channel reserving signal from the one or more transmission sources.

In an additional aspect of the disclosure, an apparatus includes at least one processor and a memory coupled to the processor. The processor is configured to determine a clear channel assessment (CCA) status for each of a plurality of unlicensed carriers designated for transmission by a base station to a UE, and to transmit to the UE a receive antenna usage adjustment signal based on the determined CCA status.

DETAILED DESCRIPTION

Figure 1:
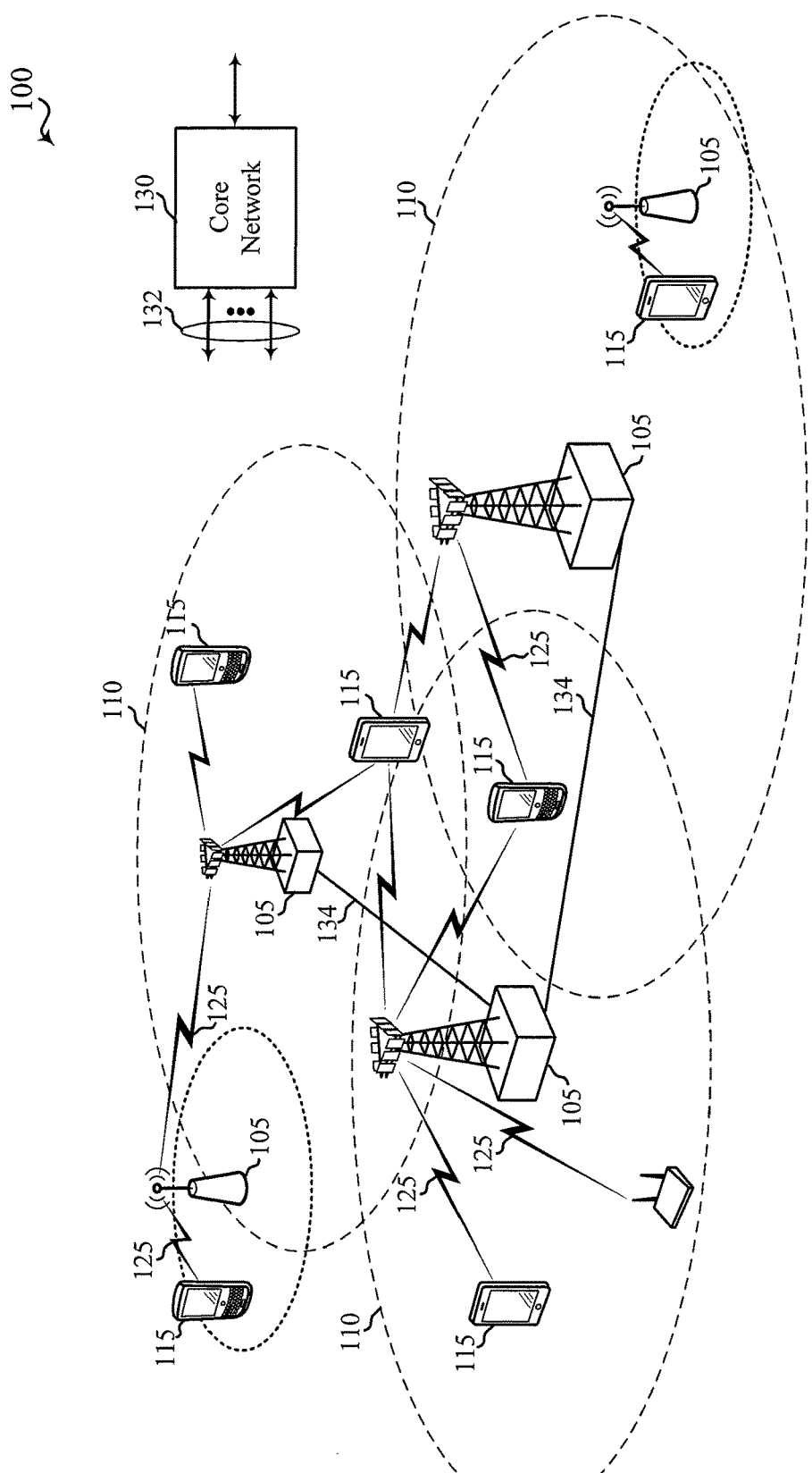
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A extending to unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., Si, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-9.

Figure 2A:
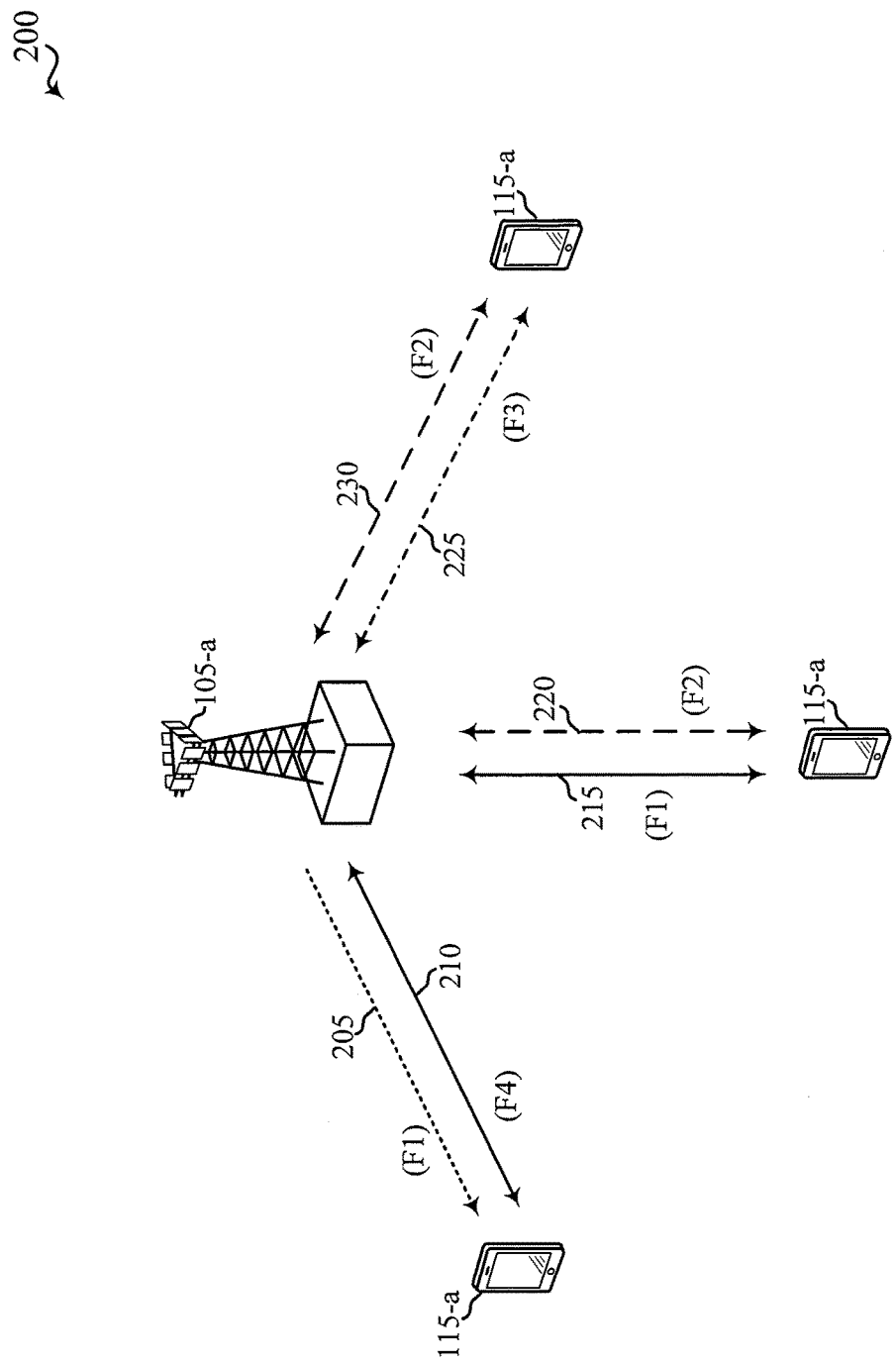
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may, be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
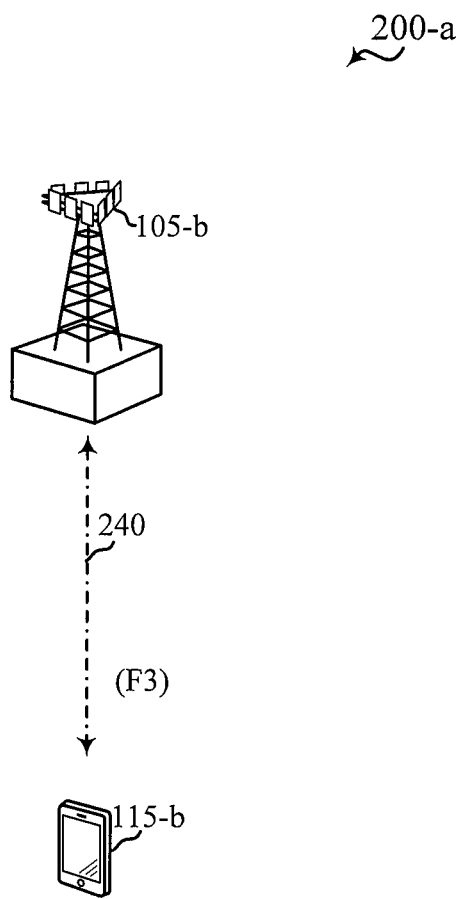
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
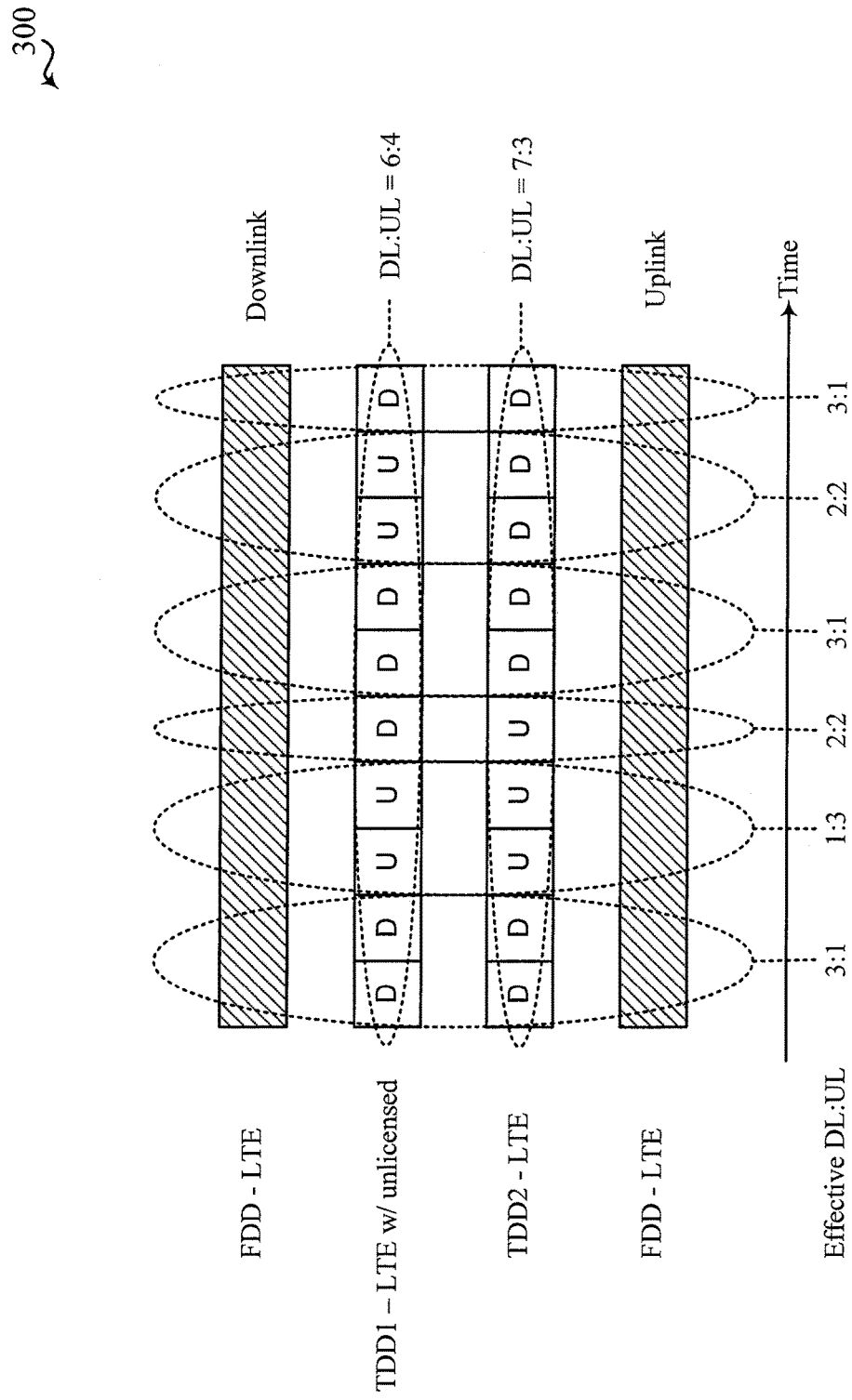
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
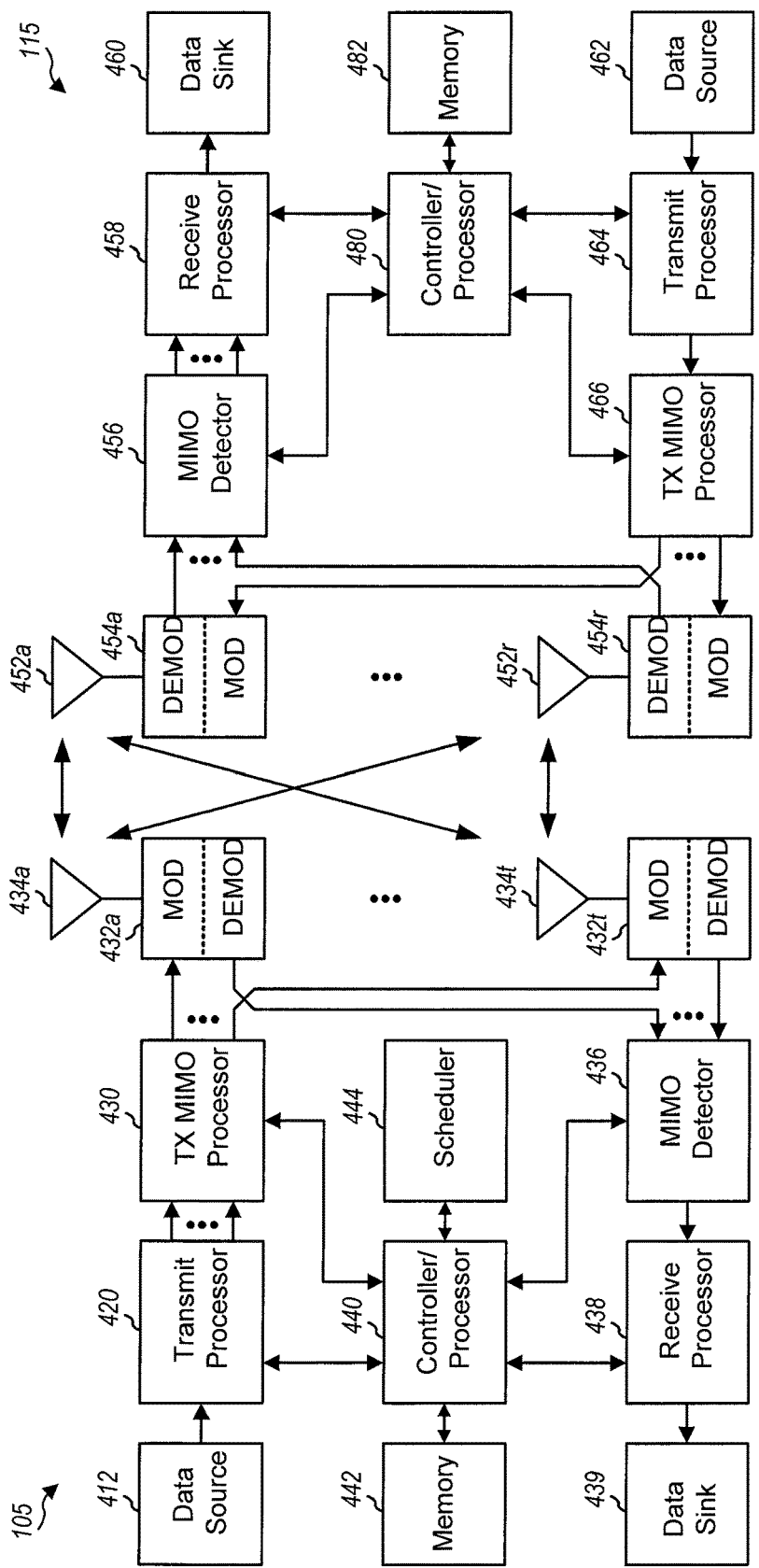
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 5 and 6, and/or other processes for the techniques described herein. The memories 442 and 482 may store data and program codes for the eNB 105 and the UE 115, respectively. A scheduler 444 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, the device may use a fixed number of antennas for one carrier in CA cases, or it may use a fixed number of antennas for WiFi when the device supports both WiFi and other technologies, such as LTE. In one example, a UE may have 4 antennas and assign 2 of the antennas for WiFi communication and 2 antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

When communication devices support two different technologies, such as WiFi and LTE, the device may reassign antennas assigned and used for WiFi communications to be used for LTE communications, either when WiFi is not allowed to transmit or when there is no need for WiFi to listen to the spectrum. In LTE/LTE-A with unlicensed spectrum, for unlicensed carriers requiring listen before talk (LBT) procedures, a communication device may not be able to transmit for a certain time duration, such as for one radio frame when a clear channel assessment (CCA) check fails for that radio frame. In both cases, the communication device may employ antenna sharing when antennas assigned for either WiFi or LTE unlicensed bands are not used. The difference between the sharing or reassignment schemes for WiFi communication and LTE unlicensed communication is that, for the unlicensed LTE/LTE-a spectrum, the time duration usable for antenna sharing or reassignment may be constant, while the time duration usable for antenna sharing or reassignment in WiFi communications may be unpredictable and variable, due to various backoff algorithms specified in WiFi communications. With such antenna sharing/reassignment, additional system level gains may be obtained from either scenario, whether between LTE and the more non-deterministic WiFi communications or between the licensed and unlicensed bands of LTE communication. Thus, the loss of transmission time due to LBT procedures in one carrier may be partially compensated by the increased receiver diversity gain in other carriers to which antennas are shared/reassigned. Antennas can be reassigned between various carriers, such as between licensed carriers and unlicensed carriers, and also between different unlicensed carriers.

In current LTE/LTE-A deployments that include unlicensed spectrum, when a CCA check clears for one carrier for one frame, it may transmit a pilot signal or other such type of channel reservation signal to reserve the channel. For example, when a CCA check is clear, the transmitter may begin transmitting channel usage beacon symbols (CUBS) in order to reserve the channel for transmission. Aspects of the present disclosure may provide for a UE to use different mechanisms in each frame to determine whether or not there is activity for a particular transmission source. For purposes of this application, transmission source represents various transmission sources over which the UE may receive communications. Examples of transmission sources include, base stations, eNBs, individual carriers, and the like. The channel reservation signal detection methods may be based solely on CUBS detection results, or may be based additionally on grant information from a primary component carrier (PCC) in cross-carrier cases. For example, if no CUBS signal or other such channel reservation signal is detected, the UE would check for any downlink and/or uplink grants that may have been received for the particular frame. If such grants have been received, then the UE will know that, despite not detecting the channel reservation signal, it may still need to keep the current antenna assignments for the downlink/uplink grant communications.

Furthermore, even if activity may be detected on unlicensed LTE/LTE-A bands, depending on the scheduled modulation coding scheme (MCS)/Spatial Scheme from the grant, the licensed LTE band may re-use some receive antennas from the unlicensed LTE bands for quality of service (QoS) purposes. For example, if the MCS in the scheduled grant would support assigning up to two antennas to a particular carrier, but the level of activity detected is small, the UE may still decide to reuse those antennas designated for unlicensed LTE band for other technologies, such as LTE, in the frame or a subset of the frame. Thus, if the transmission level associated with the assigned MCS reaches a particular level and there are more than enough antennas already assigned to accommodate the threshold level, the UE may reassign some of the antennas to other carriers for use.

Figure 5:
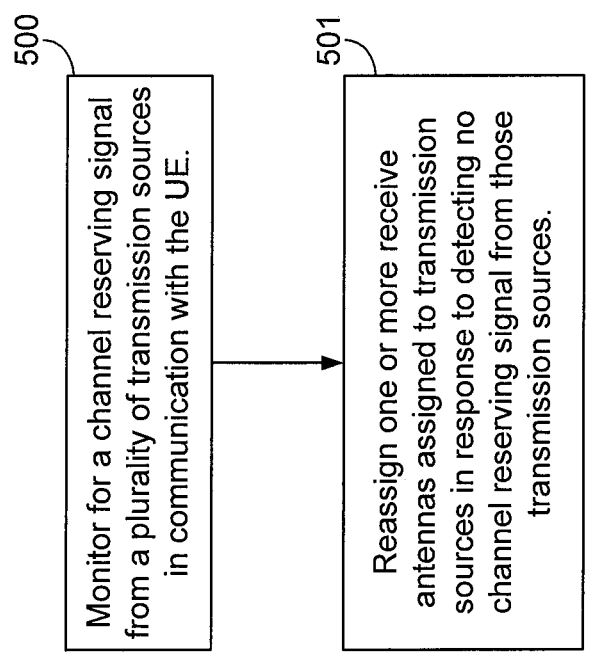

FIG. 5 is a functional block diagram illustrating example blocks executed to implement one aspect of the present disclosure. At block 500, a UE monitors for a channel reserving signal from a plurality of transmission sources in communication with the UE. The channel reserving signal may include a CUBS signal, a data or pilot transmission signal, or the like, that originate over a particular carrier transmission source or from a particular base station transmission source. At block 501, in response to detecting no channel reserving signal for one or more of the transmission sources, the UE reassigns one or more of the antennas that had been assigned to the transmission source for which no channel reserving signal was detected. For example, if a UE fails to detect a CUBS signal over a first unlicensed carrier, CA 1, the UE may then reassign then antenna(s) designated for CA 1 to join the antennas designated for receiving another carrier, CA 2. Additionally, the UE may reassign the antennas for the entire frame or for some subset or portion of the frame. CA 2 may be another unlicensed carrier or may be a licensed carrier In additional aspects of the disclosure, when no channel reserving signal is detected, the UE determines whether or not downlink or uplink grants have been received associated with that particular transmission source. The UE would typically then reassign when both no channel reserving signal is detected and no downlink or uplink grants have been received for that transmission source. In one alternative aspect, as noted above, if activity is detected on the transmission source, but that activity would not require all of the antennas allowed under the current MCS assigned in a particular grant, the UE could determine to reassign a subset of the allowed antennas for other transmission sources.

Figure 6:
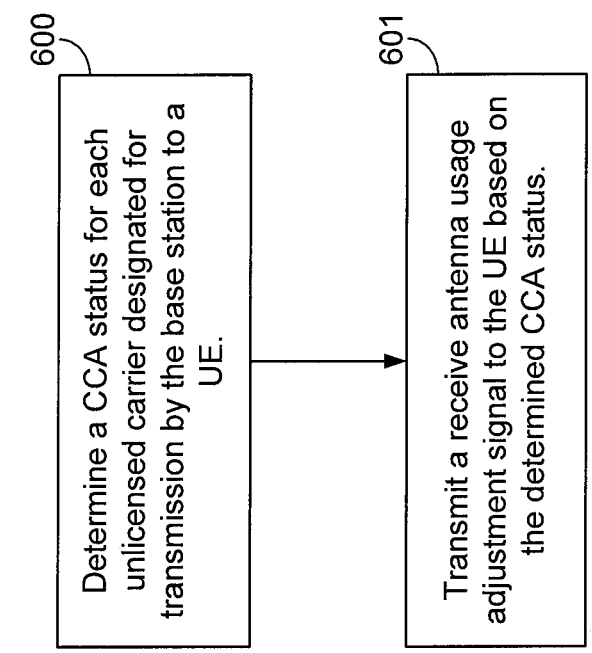
FIGS. 5 and 6 are functional block diagrams illustrating example blocks executed to implement aspects of the present disclosure.

Additional aspects of the disclosure may provide for an eNB to utilize the status of CCA checks for each carrier and antenna usage information at the UE to change its scheduling decision. FIG. 6 is a functional block diagram illustrating example blocks executed to implement one aspect of the present disclosure. At block 600, a base station determines the CCA status for each unlicensed carrier designated for transmission by the base station to a UE. The base station would know the results of each CCA check for all of the carriers designed for transmission. At block 601, the base station transmits a receive antenna usage adjustment signal to the UE based on the determined CCA statuses. For example, when a CCA check fails for a particular carrier, the base station may transmit a receive antenna usage adjustment signal in the form of an updated MCS used for the licensed LTE bands. If the CCA status indicates that one of the unlicensed carriers failed the CCA check, then the updated MCS could allow the UE to increase the number of antennas available for receiving another carrier, such as the licensed LTE carrier(s). In another aspect, the receive antenna usage adjustment signal may be either a signal for the UE to simply add antennas for use in receiving particular carriers (e.g., the carriers from which transmissions are expected) or a signal for the UE to reassign any antennas that were designated or assigned to the particular carriers for which a failed CCA status is known by the base station.

Figure 7:
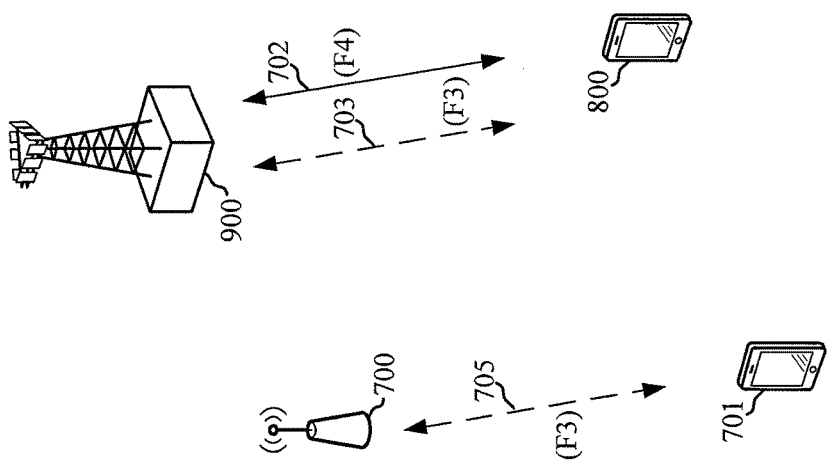
FIG. 7 is a block diagram illustrating a base station and UE configured according to one aspect of the present disclosure.

FIG. 7 is a block diagram illustrating base station 900 and UE 800 configured according to one aspect of the present disclosure. In a first example aspect, base station 900 communicates with UE 800 using two carriers, carriers 702-703. Each of carriers 702-703 is associated with a separate carrier frequency. Carrier 702 is associated with frequency F4, and carrier 703 is associated with frequency F3. In the described example, carrier 703 is an unlicensed carrier. UE 800 has four antennas and has assigned two of those antennas for carrier 702 and the other two antennas for unlicensed carrier 703. Base station 700 is also in the coverage area of base station 900 and is in communication with UE 701. Base station 700 communicates with UE 701 over unlicensed carrier 704, which is associated with frequency F3.

During communications, UE 800 monitors for channel reserving signals in each frame, such as CUBS signals, from base station 900. In one frame, UE 800 detects that base station 900 has not transmitted a channel reserving signal for unlicensed carrier 703. For example, when performing a CCA check for unlicensed carrier 703, base station 900 detects a CCA failure because of base station 700's transmission to UE 701 over unlicensed carrier 704, which uses the same unlicensed frequency F3 as unlicensed carrier 703. Because the CCA did not check out, base station 900 does not transmit a channel reserving signal. UE 800 detects this lack of channel reserving signal and reassigns the two antennas, which were previously assigned to unlicensed carrier 703, to receive signals from carrier 702.

In another example aspect illustrated in FIG. 7, a similar scenario occurs in which, because of transmissions from base station 700 to UE 701, the CCA check for unlicensed carrier 703 fails. Base station 900 recognizes the CCA status of unlicensed carrier 703 as a failed CCA status and signals to UE 800 to adjust its antenna usage. For example, when the failed CCA status is recognized by base station 900, base station 900 signals to UE 800 over carrier 702 to modify its antenna usage. This modification or antenna adjustment signal may be an updated MCS for carrier 702, which would allow UE 800 to increase the number of receive antennas for carrier 702. The modification or antenna adjustment signal may also direct UE 800 to add antennas to carrier 702 or indicate that UE 800 should reassign antennas designated for unlicensed carrier 703.

Figure 8:
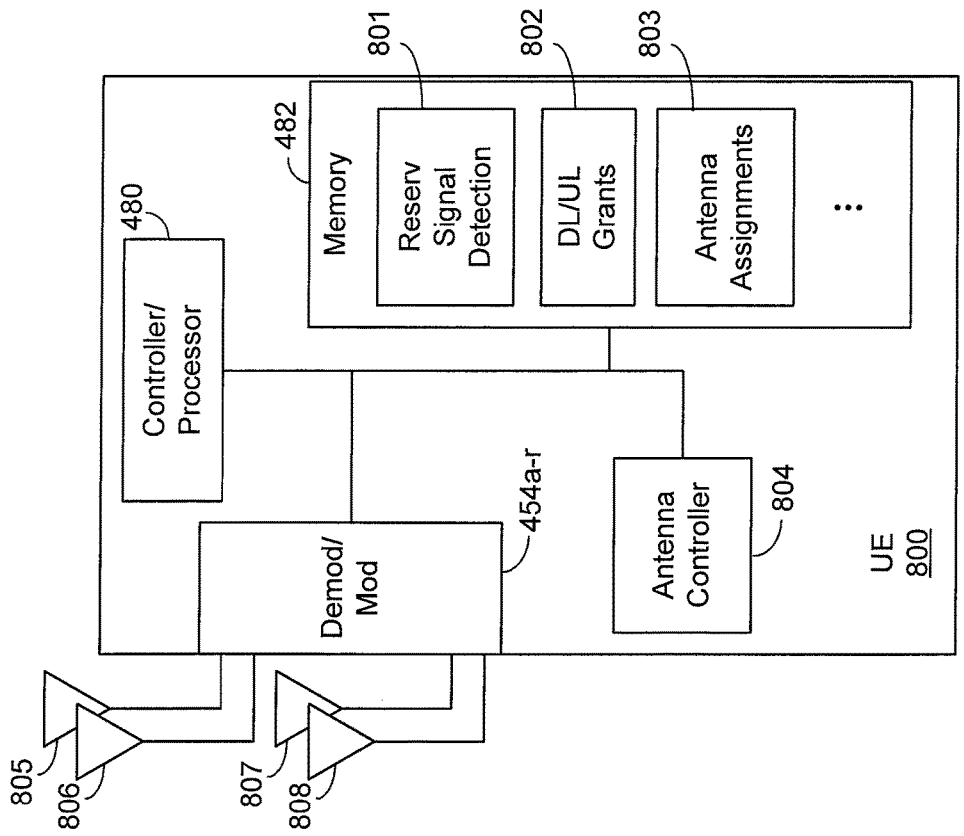
FIG. 8 is a block diagram illustrating a UE configured according to one aspect of the present disclosure.

FIG. 8 is a block diagram illustrating details of UE 800 configured according to one aspect of the present disclosure. UE 800, which may include similar components and hardware as UE 115 (FIG. 4), includes controller/processor 408. Controller/processor 408 executes the logic stored in memory 482 and controls the components, such as antenna controller 804, demodulator/modulators 454a-r, and antennas 805-808 in order to provide the functionality and features of UE 800. In operations according to various aspects of the present disclosure, UE 800, under control of controller/processor 480, executes reserving signal detection logic 801, stored in memory 482, to monitor for channel reserving signals from various transmission sources. UE 800 includes antenna assignments 803, which provide for assignment of antennas 805-808, to various transmission sources. Using antenna assignments 803, controller/processor 480 prompts antennal controller 804 to tune antennas 805-808 to their respectively assigned transmission sources. When UE 800 fails to detect a channel reserving signal from any of the transmission sources, the executing reserving signal detection logic 801 signals controller/processor 480 to reassign the antennas related to those transmission sources to another transmission source. Thus, controller/processor 480 would update antenna assignments 803 to reflect the reassignment and then prompt antenna controller 804 to reassign those antennas to the new transmission source.

It should be noted that in additional aspects of the present disclosure, when UE 800 fails to detect a channel reserving signal, it also, under control of controller/processor 480, accesses DL/UL grants 802 to determine whether it has received any grants for the particular carrier. If grants have been received, then UE 800 will not reassign any of the antennas. In alternative aspects of the present disclosure, DL/UL grants 802 may further be used when some activity is detected on a particular unlicensed carrier. If the MCS of a grant would allow for more antennas than would be required to handle the detected activity, UE 800, under control of controller/processor 480, may determine to reassign the additional antennas to another transmission source.

Figure 9:
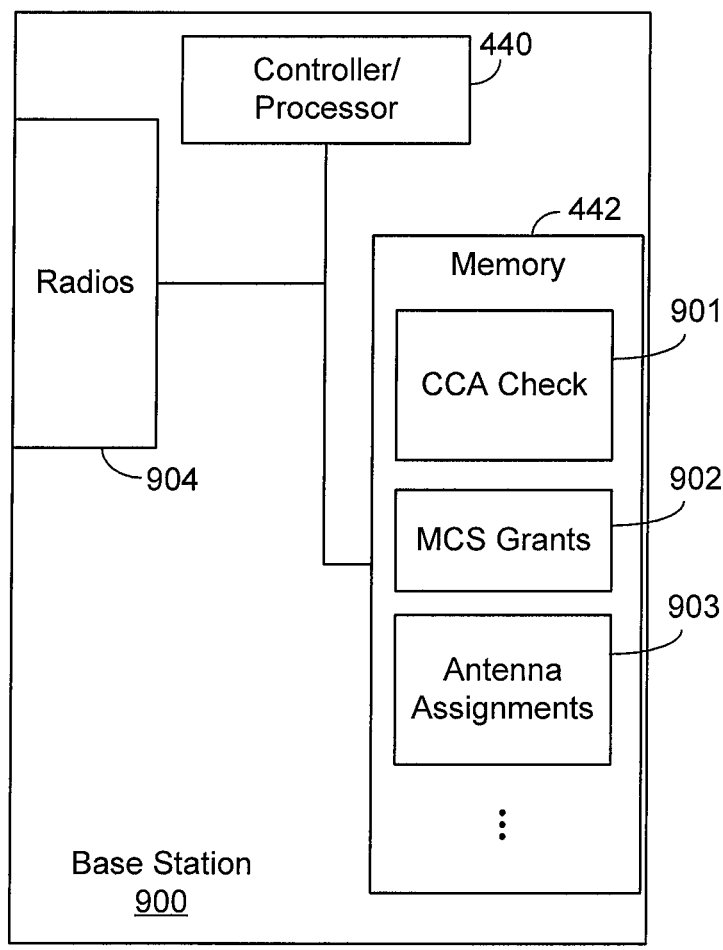
FIG. 9 is a block diagram illustrating a base station configured according to one aspect of the present disclosure.

FIG. 9 is a block diagram illustrating base station 900 configured according to one aspect of the present disclosure. Base station 900, which includes similar components to base station 105 (FIG. 4), includes controller/processor 440. Similar to UE 800, controller/processor 440 executed the logic and controls the components to enable the functionalities and features of base station 900. In operations according to the present disclosure, base station 900, under control of controller/processor 440 executes CCA check process 901, stored in memory 442, to perform CCA checks on all unlicensed carriers that base station 900 uses to communicate with various UEs. When base station 900 detects a failed CCA status, controller/processor 440 uses radios 904 to signal a UE to adjust its antenna usage. For example, in one aspect, when the failed CCA status is detected, controller/processor 440 generates a new MCS grant with MCS grants 902 and transmits the new MCS grant to the UE using radios 904. The new MCS grant would increase the MCS for the carriers that will be used for transmission, such as the licensed carries or any unlicensed carrier with a successful CCA check. In another example, when the failed CCA status is detected, controller/processor 440 would create a new antenna assignment from antenna assignments 903. The new antenna assignment would be transmitted to the UE using radios 904. The new assignment signaled may be a signal simply to add antennas to a particular carrier or may be a signal that any antennas assigned the unlicensed carrier with the failed CCA status may be reassigned by the UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
monitoring, by a user equipment (UE), for a channel reserving signal from a plurality of transmission sources in communication with the UE, the channel reserving signal being transmitted in response to a successful clear carrier assessment (CCA); and
reassigning by the UE, from at least one radio access technology (RAT) of a first type to at least one other RAT of a second type different from the first type, one or more receive antennas assigned to one or more transmission sources of the plurality of transmission sources in response to detecting no channel reserving signal from the one or more transmission sources.

2. The method of claim 1, wherein the plurality of transmission sources include one or more of:
a base station; and
a carrier band.

3. The method of claim 1, wherein the monitoring is performed in each frame, wherein the frame includes one of:
a subframe or a subset of a frame.

4. The method of claim 1, further including:
determining whether the UE has received an uplink or downlink grant for a current frame,
wherein the reassigning is further in response to determining the UE has received no uplink or downlink grant for the current frame.

5. The method of claim 4, wherein the uplink or downlink grant is received from a different carrier than a carrier for which the uplink or downlink grant is intended.

6. The method of claim 1, further including:
   determining a data rate scheme from grant information in response to detecting the channel reserving signal from the one or more transmission sources; and
   in response to the data rate scheme reaching a threshold transmission level associated with the detected channel reserving signal, reassigning one or more extra receive antennas assigned to the one or more transmission sources.

7. The method of claim 1, wherein the one or more antennas are reassigned by the UE for one of:
   a single frame; or
   a subset of a frame.

8. A method of wireless communication, comprising:
   determining, by a base station, a failed clear channel assessment (CCA) status for each of a plurality of unlicensed carriers designated for transmission by a base station to a user equipment (UE); and
   transmitting to the UE, by the base station, a receive antenna usage adjustment signal based on the determined failed CCA status, wherein the receive antenna usage adjustment signal is configured to reassign one or more receive antennas from at least one radio access technology (RAT) of a first type to at least one other RAT of a second type different from the first type.

9. The method of claim 8, wherein the receive antenna usage adjustment signal includes a signal for the UE to reassign one or more receive antennas assigned to one or more unlicensed carriers determined, by the base station, to have a failed CCA status.

10. The method of claim 8, wherein the receive antenna usage adjustment signal includes an adjustment to a modulation coding scheme (MCS) based on the CCA status for each of the plurality of unlicensed carriers.

11. The method of claim 8, wherein the receive antenna usage adjustment signal includes a signal for the UE to use one or more additional receive antennas for an identified carrier of the plurality of carriers, the one or more additional receive antennas previous assigned to one or more carriers determined to have a failed CCA status.

12. A non-transitory computer-readable medium having program code recorded thereon, comprising:
   program code for causing a computer to monitor, by a user equipment (UE), for a channel reserving signal from a plurality of transmission sources in communication with the UE, the channel reserving signal being transmitted in response to a successful clear carrier assessment (CCA); and
   program code for causing the computer to reassign by the UE, from at least one radio access technology (RAT) of a first type to at least one other RAT of a second type different from the first type, one or more receive antennas assigned to one or more transmission sources of the plurality of transmission sources in response to detecting no channel reserving signal from the one or more transmission sources.

13. The non-transitory computer-readable medium of claim 12, wherein the plurality of transmission sources include one or more of:
   a base station; and
   a carrier band.

14. The non-transitory computer-readable medium of claim 12, wherein the program code for causing the computer to monitor is executed in each frame, wherein the frame includes one of: a subframe or a subset of a frame.

15. The non-transitory computer-readable medium of claim 12, further including:
   program code for causing the computer to determine whether the UE has received an uplink or downlink grant for a current frame,
   wherein the program code for causing the computer to reassign is further in response to determining the UE has received no uplink or downlink grant for the current frame.

16. The non-transitory computer-readable medium of claim 15, wherein the uplink or downlink grant is received from a different carrier than a carrier for which the uplink or downlink grant is intended.

17. The non-transitory computer-readable medium of claim 12, further including:
   program code for causing the computer to determine a data rate scheme from grant information in response to detecting the channel reserving signal from the one or more transmission sources; and
   program code, executable in response to the data rate scheme reaching a threshold transmission level associated with the detected channel reserving signal, for causing the computer to reassign one or more extra receive antennas assigned to the one or more transmission sources.

18. The non-transitory computer-readable medium of claim 12, wherein the one or more antennas are reassigned by the UE for one of:
   a single frame; or
   a subset of a frame.

19. An apparatus configured for wireless communication, the apparatus comprising:
   at least one computer processor; and
   a memory coupled to the at least one computer processor, wherein the at least one computer processor is configured:
      to monitor, by a user equipment (UE), for a channel reserving signal from a plurality of transmission sources in communication with the UE, the channel reserving signal being transmitted in response to a successful clear carrier assessment (CCA); and
      to reassign by the UE, from at least one radio access technology (RAT) of a first type to at least one other RAT of a second type different from the first type, one or more receive antennas assigned to one or more transmission sources of the plurality of transmission sources in response to detecting no channel reserving signal from the one or more transmission sources.

20. The apparatus of claim 19, wherein the plurality of transmission sources include one or more of:
   a base station; and
   a carrier band.

21. The apparatus of claim 19, wherein the configuration of the at least one computer processor to monitor is executed in each frame, wherein the frame includes one of: a subframe or a subset of a frame.

22. The apparatus of claim 19, further including configuration of the at least one computer processor:
   to determine whether the UE has received an uplink or downlink grant for a current frame,
   wherein the configuration of the at least one computer processor to reassign is further in response to determining the UE has received no uplink or downlink grant for the current frame.

23. The apparatus of claim 22, wherein the uplink or downlink grant is received from a different carrier than a carrier for which the uplink or downlink grant is intended.

24. The apparatus of claim 19, further including configuration of the at least one computer processor:

to determine a data rate scheme from grant information in response to detecting the channel reserving signal from the one or more transmission sources; and to reassign, in response to the data rate scheme reaching a threshold transmission level associated with the detected channel reserving signal, one or more extra receive antennas assigned to the one or more transmission sources.

25. The apparatus of claim 19, wherein the one or more antennas are reassigned by the UE for one of:
a single frame; or
a subset of a frame.

26. The method of claim 1, wherein the RAT of the first type is at least one of WiFi or long term evolution (LTE) unlicensed and the RAT of the second type is LTE.

27. The method of claim 8, wherein the RAT of the first type is at least one of WiFi or long term evolution (LTE) unlicensed and the RAT of the second type is LTE.

28. The non-transitory computer-readable medium of claim 12, wherein the RAT of the first type is at least one of WiFi or long term evolution (LTE) unlicensed and the RAT of the second type is LTE.

29. The apparatus of claim 19, wherein the RAT of the first type is at least one of WiFi or long term evolution (LTE) unlicensed and the RAT of the second type is LTE.

* * * * *